United States Patent Office 3,491,358
Patented Jan. 20, 1970

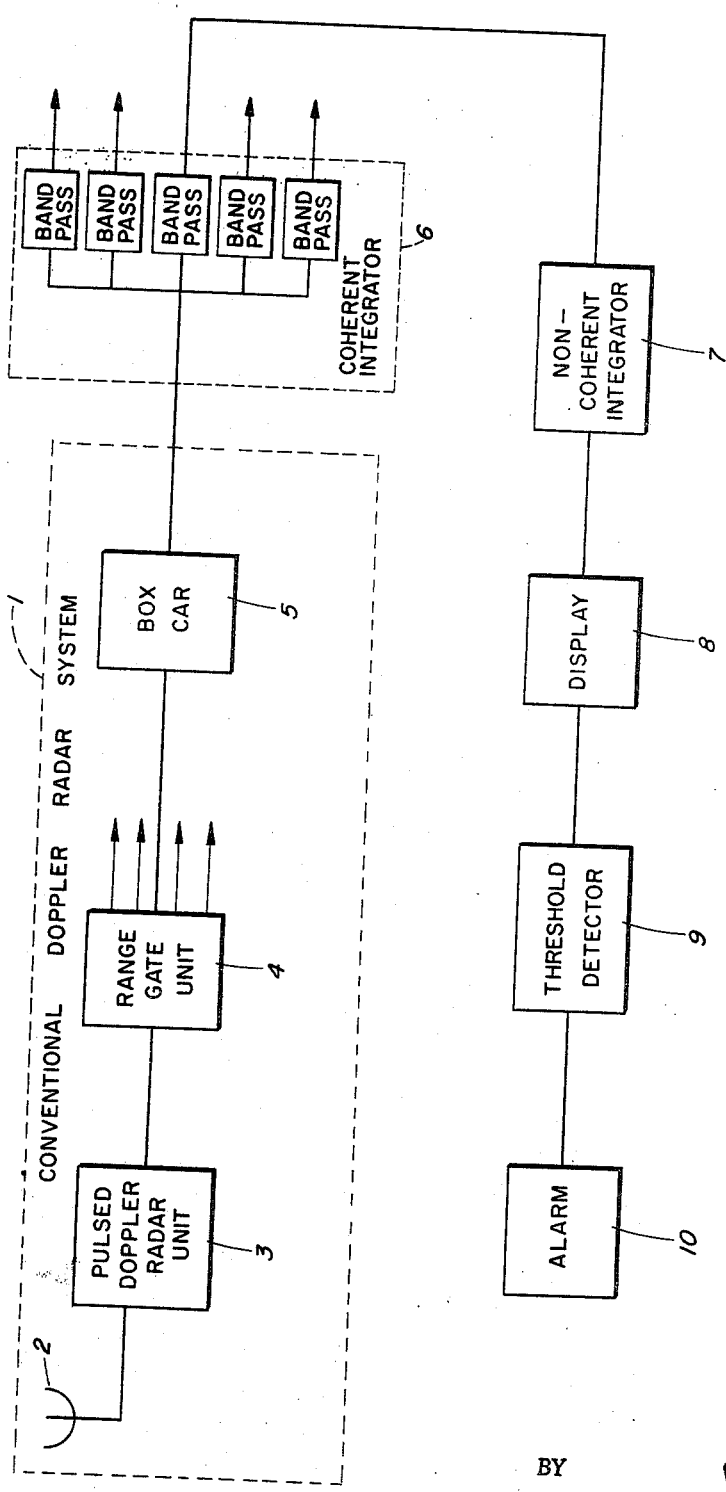

3,491,358
ATMOSPHERIC TURBULENCE DETECTION SYSTEM
John J. Hicks, Bowie, Md., assignor, by mesne assignments, to the United States of America as represented by the Secretary of the Navy
Filed Feb. 2, 1968, Ser. No. 702,640
Int. Cl. G01s 9/02
U.S. Cl. 343—5            3 Claims

ABSTRACT OF THE DISCLOSURE

A conventional pulsed Doppler radar system is operated with a fixed but changeable antenna position, a particular range or set of ranges is chosen and their outputs are processed including coherent integration. Analysis of the Doppler frequency spectrum yields information regarding clear air turbulence in the atmospheric volume being monitored.

Background of the invention

This invention relates generally to systems for detecting atmospheric turbulence and more particularly to an improved air turbulence detection radar system adapted to detect clear air turbulence.

Clear air turbulence, ordinarily not visible to the human eye, constitutes a threat to the safety of aircraft. Detection of clear atmospheric disturbances from a distance is obviously desirable, however prior art aircraft radar systems have been shown to be deficient in power or sophistication to provide indications of such turbulence. Most prior art ground radar systems are also inadequate to detect this phenomenon. Clear air turbulence is associated with inhomogeneities in the air temperature and humidity that cause fluctuations in the index of refraction at radar frequencies. The minute fluctuations in the refractive index provide very weak radar echoes which cannot be detected in ordinary prior art radar systems. One prior art ground radar system is directed to clear air turbulence (CAT) detection, however, it requires two separate radar installations to avoid ground clutter, and moreover it operates under an unproved theory that CAT is not present in stratified layers which provide steady radar returns (specular reflections). By ignoring specular-like signals, the system may possibly neglect important CAT signals. In addition, the prior art systems do not determine CAT region thickness nor wind velocity at turbulence altitude.

Summary of the invention

Accordingly one object of this invention is to provide a new and improved clear air turbulence radar detection system.

Another object of the invention is the provision of a simplified clear air turbulence radar detection system.

Still another object of the present invention is to provide a clear air turbulence detection system adapted to detect fluctuations in stratified atmospheric layers.

A further object of the instant invention is to provide a clear air turbulence detection system adapted to determine the thickness of the CAT region.

A still further object of this invention is the provision of a clear air turbulence detection system adapted to measure wind velocity at the CAT altitude.

Yet another object of the invention is to provide a clear air turbulence detection system substantially immune to ground clutter.

Briefly, in accordance with one embodiment of this invention, these and other objects are attained by providing in a clear air turbulence detection system the combination of a conventional pulse Doppler radar system and an antenna adjustable in azimuth and elevation, the radar system having range gating circuits to provide for sampling the atmosphere from a contiguous set of selected, but adjustable, range increments. The radar system output for each range increment is fed to a coherent integrator, which may be a bank of individual filters, followed by a non-coherent integrator and suitable displays. If desired, a threshold detector and alarm system may be employed to permit unattended operation.

Brief description of the drawing

A more complete appreciation of the invention and many of the attendant advantages thereof will be readily appreciated as the same becomes better understood by reference to the following detailed description when considered in connection with the accompanying drawing wherein the sole figure is a block diagrammatical view of the overall clear air turbulence detection system according to the present invention.

Description of the preferred embodiment

Referring now to the drawings wherein the clear air turbulence detection sytem is shown comprising a conventional Doppler radar system 1 having a conventional antenna 2, adjustable in azimuth and elevation, for transmitting electro-magnetic energy from a high power pulsed Doppler radar unit 3 and for receiving radar echoes. The signal output of the phase comparators of the Doppler radar, the in phase and/or quadrature components of received signals, are fed to a range gate unit 4 which may provide one or several range outputs. A single range may be monitored or alternatively, if desired, several range outputs may be separately processed simultaneously in order to provide greater coverage of suspected CAT regions at one time, in which case duplicate processing apparatus following each range gate is required. Assuming, for exemplary purposes, that a single range is processed, the echoes received from that range, which corresponds to a volume in the atmosphere, is fed to a box car 5 that provides an output proportional to the amplitude and phase of the input echoes. The latter signal is applied to a coherent integrator 6 which may be a bank of separate bandpass filters covering the frequency range of 0 to $PRF/2$ or a single scanning filter with variable pass bands capable of scanning this or smaller frequency intervals within 0 to $PRF/2$. If a filter bank is chosen, the filters should be narrow and closely spaced and the output of each individually applied to separate processing channels each having a conventional non-coherent integrator 7. If a single scanning filter is chosen, its output is fed to a single non-coherent integrator 7. The output of each non-coherent integrator is monitored simultaneously by a visual or audio display device 8 which provides the intensity of CAT echo as a function of frequency. The signal may then, if desired, be fed to a threshold detector 9 to activate an alarm 10 when a predetermined signal amplitude level and/or width of the frequency components of the CAT echoes are exceeded.

In operation, the radar wavelength $\lambda$ is not extremely critical, and will likely fall within the range of 5 cm. to a few meters. The pulse repetition frequency (PRF) should be chosen to be large enough to permit the maximum wind velocity of interest to be observed without folding and small enough to prevent ambiguities in range. The optimum PRF depends on $\lambda$ and for radars with $\lambda > 5$ cm. of PRF of 2000 pulses per second is probably sufficient and may be reduced if the wavelength is greater. For a selected range, or distance, a particular volume of the atmosphere, dependent upon radar pulse length and beam width, will be monitored. Analysis of the return signals to determine their frequency content will provide quantitative information regarding turbulence in the atmosphere being monitored. Since the frequency spectrum from 0 to PRF/2 includes all measurable frequency components only this frequency interval need be monitored. Ground clutter will be around 0 Hz. while the CAT echoes may be removed from this frequency by selection of elevation and azimuth angles based on crude wind estimates at the CAT altitude and hence ground clutter echoes are easily separated from CAT echoes, and hence ignored. Since the CAT echoes are very weak, a low signal to noise ratio must be achieved. Coherent integration, provided by block 6, achieves this and provides a gain of $n^{1/2}$ over a non-coherent integrator (where $n$ is the number of pulses integrated). For optimum signal enhancement the filter bandwidth would be matched to the bandwidth of the process (the CAT echo frequency band). The coherent integration time is the reciprocal of the filter bandwidth, hence the smallest bandwidth possible for a given process is desirable. Signal-to-noise ratio may be further improved by the non-coherent integrator 7, by integrating over a period of time up to the length of time that the turbulence remains stationary.

If a filter bank is used having a plurality of narrow, adjacent, equal-bandwidth filters, it is likely that the turbulence echo will fall within the range of more than one of the filters. By monitoring each filter output simultaneously it is possible to ascertain the frequency spectrum of the echo. The displacement of the center of the spectrum along the $$0 - \frac{PRF}{2}$$

axis gives the radial component of the mean velocity $2v$, of the turbulence via the Doppler relation $$f = \frac{2v}{\lambda}$$

The mean velocity of the turbulence may readily be determined from the azimuth and elevation angles and the raidal component of the velocity at two azimuths.

The width of the process is an indication of the strength of the turbulence; the wider the spectrum the greater the CAT intensity. The wind shear within the volume of space being examined also contributes to the width of the spectrum but is minimized by pointing the antenna as near the vertical as possible and yet eliminating the ground clutter. This is recommended as it not only effectively removes the effect of shear broadening of the spectrum but allows operation at the closest range possible which further increases the CAT signal-to-noise ratio or improves detectability.

If the Doppler spectrum of CAT changes with time utilization of a scanning filter with a variable bandwidth controlled by an operation servo-mechanism would permit more efficient integration and determination of the spectrum since the filter could be "zeroed-in" on the process both in frequency and bandwidth. If the Doppler spectrum of CAT does not change rapidly a commercial spectrum analyzer may be used.

An alarm system using conventional techniques may be employed to give an automatic indication of CAT signals.

The clear air turbulence detection system using many of the Doppler radar techniques described herein has been found to provide characteristics of CAT heretofore unobtainable in prior art systems. Field tests involving jet aircraft have verified the close correlation between CAT and the echoes detected by the system.

Obviously, numerous modifications and variations of the present invention are possible in light of the above teachings. It is therefore to be understood that within the scope of the appended claims the invention may be practiced otherwise than as specifically described herein.

What is new and is desired to be secured by Letters Patent of the United States is:

1. An atmospheric turbulence detection system comprising
   means for transmitting electromagnetic wave energy of a certain PRF and for receiving echoes of the transmitted pulses reflected from the atmosphere,
   means for providing at least one first signal correlative to the in-phase components of the echoes received from the atmosphere at a certain range,
   means for developing at least one second signal proportional to the amplitude and phase of the echoes received from the atmosphere within said certain range and represented in said first signal,
   coherent integration means individual to each of said second signal developing means having an overall bandwidth of a frequency of 0 to PRF/2 and an integration time equivalent to the reciprocal of said overall bandwidth for developing a third signal, said coherent integration means comprising a plurality of adjacent narrow band filters of equal bandwidth,
   non-coherent integrating means individual to each of said coherent integration means for integrating said third signal over a predetermined time period, and
   means for monitoring said integrated third signal to determine the width and the mean frequency of the frequency spectrum of the echoes as represented in said third signal thereby to obtain an indication of the turbulence in the atmosphere reflecting said echo.

2. An atmospheric turbulence detection system according to claim 1 wherein
   said non-coherent integrating means is individual to each of said filters.

3. An atmospheric turbulence detection system according to claim 1 wherein
   said means for monitoring said non-coherent integrating means provides an indication of the velocity and the severity of the turbulence in the atmosphere reflecting said echo.

References Cited

UNITED STATES PATENTS

| | | | |
|---|---|---|---|
| 3,360,793 | 12/1967 | Collis | 343—5 |
| 3,359,557 | 12/1967 | Fow et al. | 343—5 |
| 3,251,057 | 5/1966 | Buehler et al. | 343—5 |
| 2,848,713 | 8/1958 | Cowart et al. | 343—8 |
| 3,404,396 | 10/1968 | Buehler | 343—5 |

OTHER REFERENCES

Skolnik: Radar Systems, McGraw-Hill (1962), p. 152.

RODNEY D. BENNETT, JR., Primary Examiner

T. H. TUBBESING, Assistant Examiner